US007617523B2

(12) United States Patent
Das et al.

(10) Patent No.: US 7,617,523 B2
(45) Date of Patent: Nov. 10, 2009

(54) FORTIFIED AUTHENTICATION ON MULTIPLE COMPUTERS USING COLLABORATIVE AGENTS

(75) Inventors: Tapas K. Das, Singapore (SG); Nitin Sharma, Bhilai (Chattisgarh) (IN); Jingxue Shen, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 11/256,849

(22) Filed: Oct. 21, 2005

(65) Prior Publication Data

US 2007/0050845 A1    Mar. 1, 2007

(30) Foreign Application Priority Data

Aug. 31, 2005   (SG)   ............... PCT/SG2005/000303

(51) Int. Cl.
 *H04L 29/06* (2006.01)
(52) U.S. Cl. ............................................. 726/5; 380/1
(58) Field of Classification Search ................ 726/5; 380/1
See application file for complete search history.

(56) References Cited

U.S. PATENT DOCUMENTS

| 5,241,594 | A | * | 8/1993 | Kung ........................ 713/151 |
| 5,590,197 | A | | 12/1996 | Chen et al. |
| 2002/0095389 | A1 | * | 7/2002 | Gaines ........................ 705/67 |
| 2004/0117662 | A1 | | 6/2004 | Ong |
| 2004/0260647 | A1 | | 12/2004 | Blinn et al. |
| 2008/0109895 | A1 | * | 5/2008 | Janevski ...................... 726/19 |

FOREIGN PATENT DOCUMENTS

| CA | 2 353 308 A1 | 1/2003 |
| WO | WO 02/31679 A1 | 4/2002 |

* cited by examiner

*Primary Examiner*—Kambiz Zand
*Assistant Examiner*—Stephen Sanders
(74) *Attorney, Agent, or Firm*—Stephen J. Walder, Jr.; Jeffrey S. LaBaw

(57) ABSTRACT

Authentication mechanisms for accessing one or more applications by a user by using collaborative agents for automating authentication to the one or more applications. The use of collaborative agents obviates a need for the user to remember fortified authentication credentials for each application.

34 Claims, 4 Drawing Sheets

FORTIFIED AUTHENTICATION ON MULTIPLE COMPUTERS USING COLLABORATIVE AGENTS

CROSS-REFERENCE TO RELATED APPLICATIONS

Priority of International Patent Application No. PCT/SG2005/000303, filed on Aug. 31, 2005, is claimed under 35 U.S.C. § 119.

TECHNICAL FIELD

The present invention is directed to system security, and more specifically to using collaborative agents for automating authentication for allowing a user to access a plurality of applications to obviate a need for the user to remember fortified authentication credentials for each application.

BACKGROUND

Frequently, access to applications is protected by weak authentication credentials. Users use weak forms of authentication because users find it difficult to remember fortified forms of authentication. The user's difficulty is compounded when different authentication credentials are required to access each application of a myriad of applications. An example of a weak form of authentication is a simple password that is easy to guess.

Enterprises have a need for fortified authentication credentials in order to protect access to their enterprise application system. Fortified authentication is driven by risk mitigation and regulatory compliance. In one approach, enterprises implement a two-factor authentication for each application in their enterprise application system. A two-factor authentication combines a strong password with an authentication token. Such a two-factor authentication leverages what the user possesses (the authentication token) and what the user knows (the password). The use of fortified authentication including the use of two-factor authentication in order to access each application distributed across several computers, including remote computers, imposes a considerable burden on the user.

In view of the foregoing, there is a need for a method and system for using fortified authentication credentials without requiring the user to manually authenticate herself for logging into each computer on which a desired application is managed and without requiring the manual authentication that is required to access each desired application.

DETAILED DESCRIPTION

According to one aspect of certain embodiments, a user that wishes to access any number of authentication-protected applications that are distributed across several local and remote computers is aided by computer-implemented agents that collaborate to obtain access to the protected applications. According to certain embodiments, the collaborative agents work together to automate seamless login procedures onto local and remote computers that require fortified authentication for access. Further, the collaborative agents work together to automate authentication procedures to access any desired application whether running on a local or remote computer. When the user tries to log into an application running locally or remotely, the corresponding agent automatically injects application authentication credentials on behalf of the user, according to certain embodiments.

According to one aspect, fortified authentication for protecting access to the several local and remote computers as well as access to any desired application from a plurality applications include a strong password. A strong password is a complex password that is difficult to guess. For example, a strong password can be combination of numbers and symbols combined with letters of the alphabet in varying case format. Another example of a strong password is a dynamically generated one-time password (OTP). According to another aspect, fortified authentication includes the use of a second factor authentication credential. Examples of second factor authentication credentials include smart cards, proximity cards, and fingerprints.

Smart cards provide a public/private key pair that can be used for authentication. Proximity cards are access cards that provide an RFID that uniquely identifies a given access card.

According to certain embodiments, the user securely logs into a computer-implemented agent running on the user's local computer. The computer-implemented agent running on the user's local computer is also herein referred to as a local agent. Once the user is logged into the local agent, the local agent automates the authentication for accessing any application that the user desires to access. According to certain embodiments, the local agent automatically retrieves authentication credential information associated with the user. The local agent establishes secure communication channels with one or more remote computers in order to log in and begin communication with the corresponding computer-implemented agent implemented on the one or more remote computers. The computer-implemented agent running on a remote computer is also herein referred to as a remote agent. The local and remote agents collaborate to exchange and/or update authentication information for accessing applications.

Figure 1:
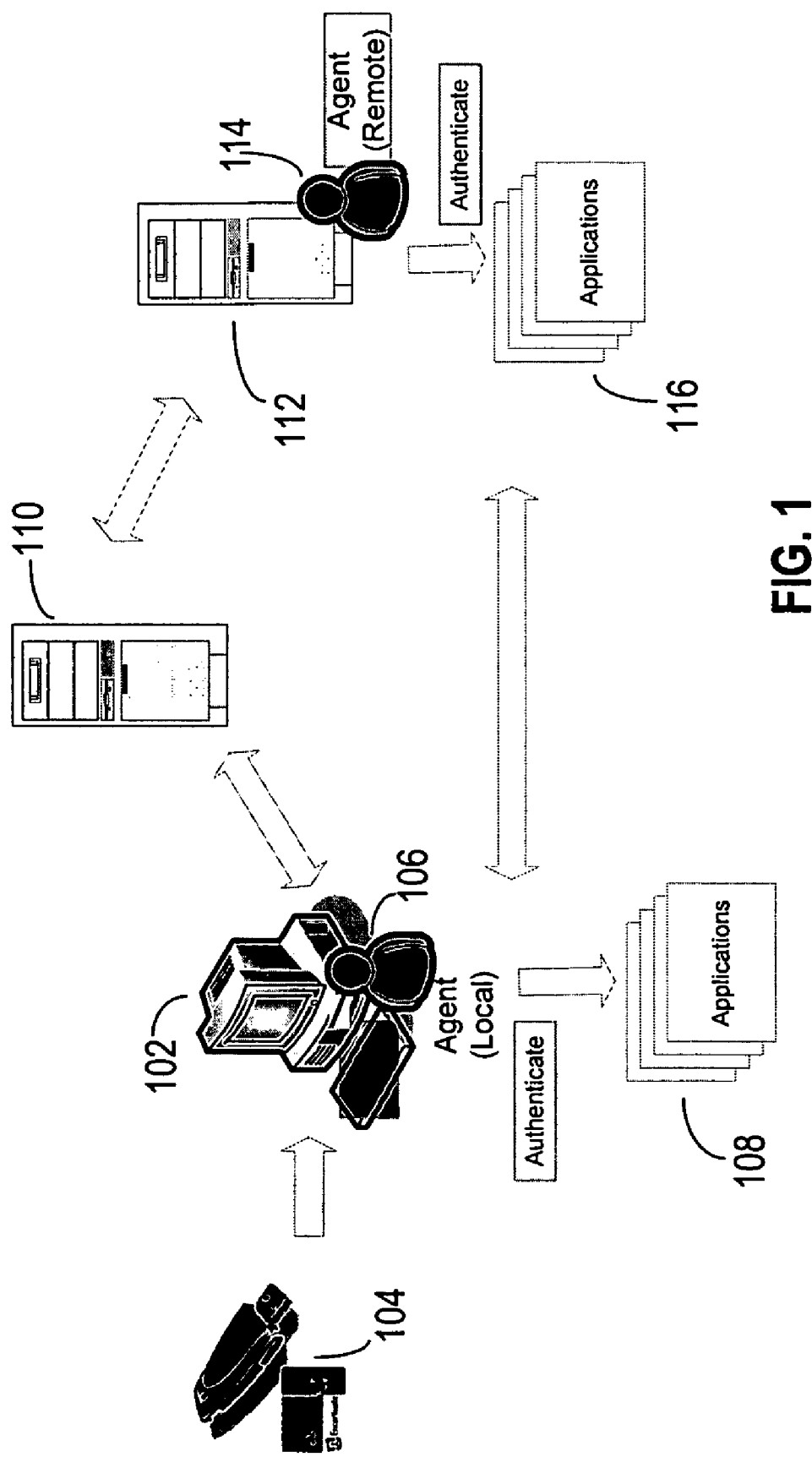
FIG. 1 is a high-level block diagram that illustrates some components used in a fortified authentication system using collaborative agents, according to certain embodiments.

FIG. 1 is a high-level block diagram that illustrates some components used in a fortified authentication system using collaborative agents, according to certain embodiments. FIG. 1 shows second factor authentication components 104, local computer 102 associated with a user, a computer-implemented local agent 106, local applications 108 running on local computer 102, a credential management server 110, a remote computer 112, a computer-implemented remote agent 114, and remote applications 116 running on remote computer 112. The manner in which the components in FIG. 1 are used is described in greater detail with reference to FIG. 2, FIG. 3 and FIG. 4 herein. For purposes of explanation, assume that a user logs into a local computer and may choose to run one or more applications. Further assume that some of the applications that the user wishes to access run on one or more remote computers while some other applications, also desired by the user, run on the user's local computer. While FIG. 1 shows only one remote computer and one credential server, the embodiments may include several remote computers and credential servers that can be accessed by the user if proper authentication credentials are used. The number of remote computers and credential servers vary from implementation to implementation. Further, the second factor authentication components and credential management server are optional.

Figure 2:
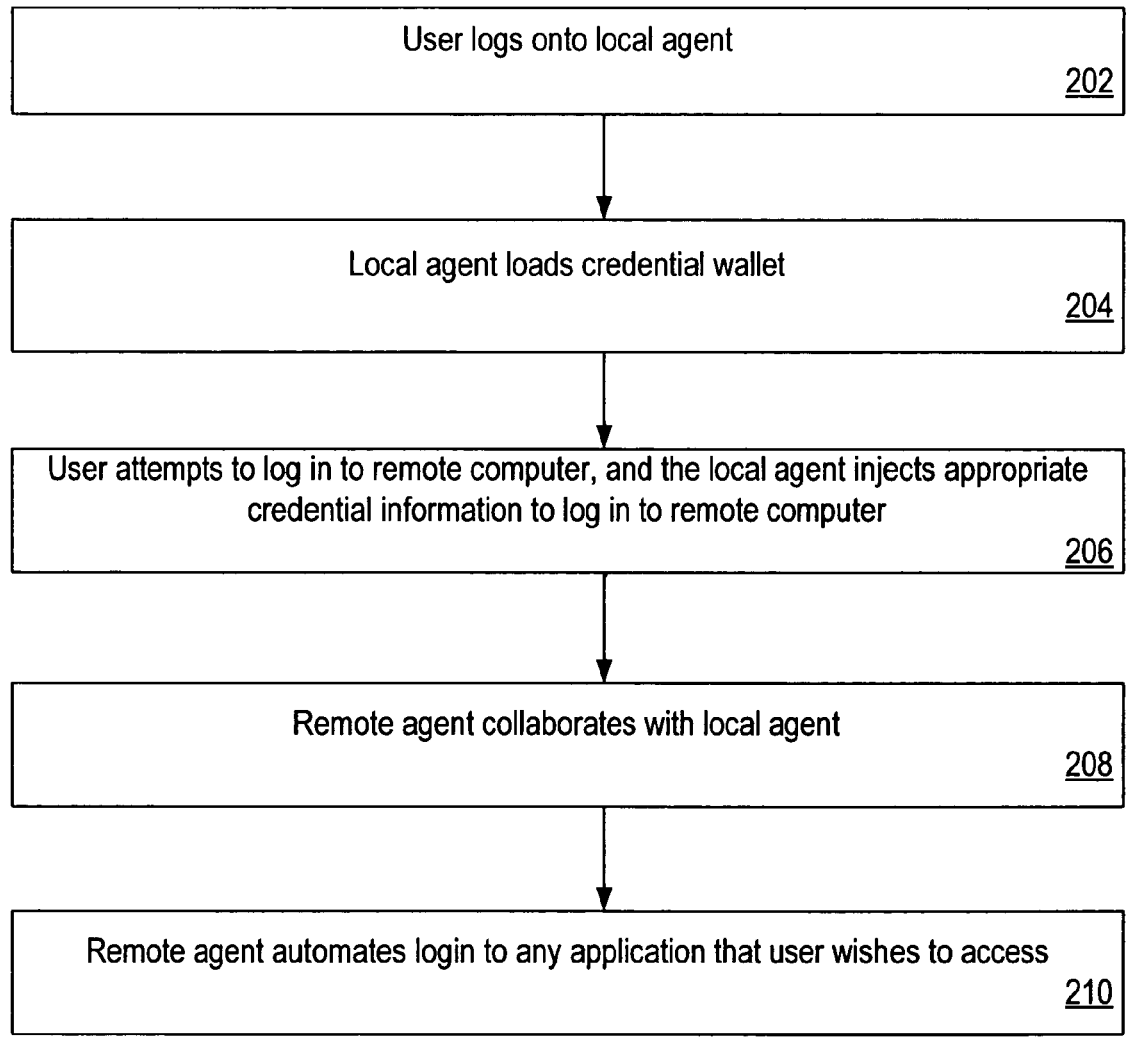
FIG. 2 is a flowchart that illustrates the collaboration of agents when a user initially logs into the user's local computer, according to certain embodiments.

FIG. 2 is a flowchart that illustrates the collaboration of agents when a user initially logs into the user's local computer, according to certain embodiments. At block 202 of FIG. 2, a user securely logs in to the local agent, such as local agent 106 of FIG. 1, on the user's local computer, such as local computer 102 of FIG. 1. As an example, the user can securely log in to the local agent by using appropriate login credentials, such as a user name, password and optionally a second factor authentication credential. Examples of second factor authentication credentials include a smart card, a proximity card, and the user's fingerprint or other physical features that are captured by a suitable biometric device. Upon successful login to the local agent, the local agent can retrieve operating system credentials that can be used for logging the user to the Windows or UNIX desktop on the local computer. Alternatively, according to certain embodiments, if the user is already logged into the Windows or UNIX desktop on the local computer, the user has the option to log into the local agent from the Windows or UNIX desktop.

At block 204, once the user successfully logs into the local agent, the local agent retrieves the user's authentication credentials. The user's authentication credentials include authentication credentials for logging in to a remote computer or for opening applications that run on the local computer and/or the remote computer. For example, the local agent can load the user's credential wallet from the local computer's hard disk or download the credential wallet form the credential management server, according to certain embodiments. In certain embodiments, the local agent may load the user's credential wallet from a removable media, such as a thumb drive, for example.

According to certain embodiments, the local agent obtains the user's user name and password from the credential wallet in order to log into the desktop application of operating system of the local computer. For example, the local agent can obtain login credential information from the credential wallet in order to log in to the Windows desktop user interface or to the UNIX desktop user interface. The embodiments are not limited to any particular type of desktop application.

At block 206, the user attempts to log into a remote computer, such as remote computer 112 of FIG. 1. For example, the user may launch a remote desktop protocol (RDP) client application in order to log into the remote Windows terminal computer. As another example, the user may launch a Citrix independent computing architecture (ICA) application in order to log into the remote Citrix Metaframe computer. In response to the user's attempt to log into the remote computer, the local agent recognizes the login screen and injects the appropriate user name and password from the credential wallet in order to log the user in to the remote computer. According to certain embodiments, the remote desktop application such as the RDP client application or the Citrix ICA client application is automatically launched when the user has successfully logged onto the local agent. The local agent then automatically injects the appropriate user name and password from the credential wallet in order to log the user into the remote Windows or remote Citrix metaframe.

At block 208, after successfully logging on to the remote computer, the computer-implemented remote agent associated with the remote computer starts up automatically and begins collaborating with the local agent at the user's local computer. For example, the remote agent sends a message, through a secure channel of communication, to the local agent requesting the user's credential wallet. In response, the local agent sends the user's credential wallet to the remote agent.

At block 210, the remote agent automates the login procedure to any application that the user wishes to access. In other words, when the user attempts to log onto any application on the remote computer, the remote agent is able to obtain the appropriate application credential in order to obtain access to the application on behalf of the user.

Figure 3:
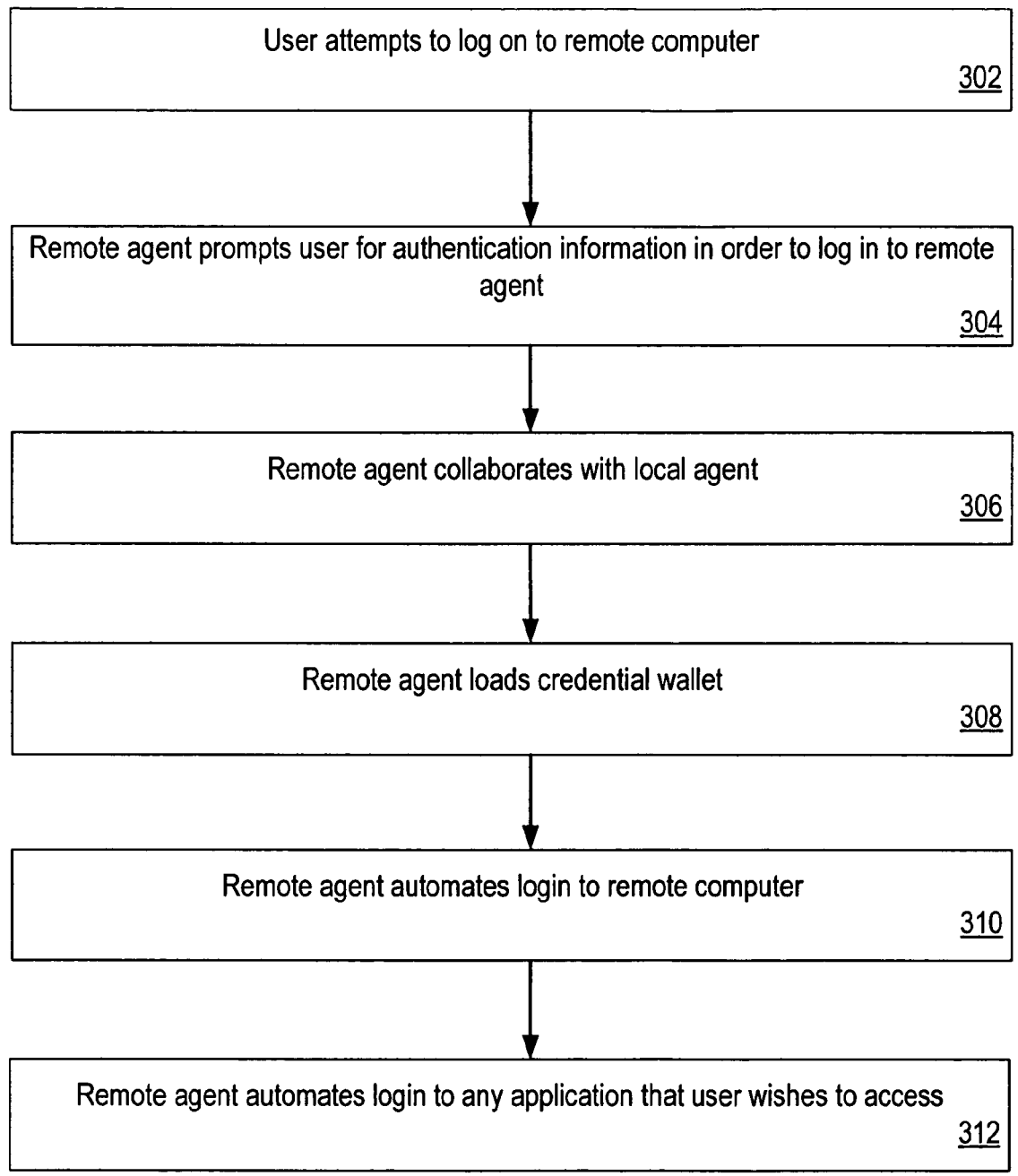
FIG. 3 is a flowchart that illustrates the collaboration of agents when a user initially logs into a remote computer, according to certain embodiments.

FIG. 3 is a flowchart that illustrates the collaboration of agents when a user initially logs onto a local computer in order to access a remote computer, according to certain embodiments. At block 302, the user attempts to log into a remote agent on a remote computer before logging onto the local agent on the user's local computer. For example, the user launches the remote desktop protocol (RDP) client application or the Citrix ICA client application on the remote computer. In response, at block 304, the remote agent associated with the remote computer prompts the user for authentication credentials in order to log into the remote agent. For example, the remote agent may ask the user to enter his user name, password and a second factor credential for authentication. The second factor authentication is an optional feature. According to certain embodiments, the remote agent may ask the user to enter only his user name and password.

At block 306, the remote agent, after verifying the user's password, collaborates with the local agent by asking the local agent to monitor for input of the second factor credential in order to verify the second factor credentials. If the local agent has already verified the second factor credentials, then the local agent notifies the remote agent that the user is authenticated. If the local agent has not already verified the second factor credentials, then the local agent waits for the user to present the second factor credentials.

For example, in the case of an RFID proximity card, the local agent can detect the tapping of the RFID card and in response, can send the corresponding RFID to the remote agent for verification.

In the case of a fingerprint authentication, the local agent captures the user's fingerprint and sends the captured fingerprint to the remote agent for verification. In the case of a smart card token, the local agent detects the insertion of the smart card token at a USB port at the local computer or detects data from a smart card reader associated with the local computer. After detecting the insertion of the smart card token, the local agent sends a request to the remote agent for the password entered by the user. The remote agent responds with the password and the local agent verifies the smart card PIN with the password received from the remote agent. The local agent then notifies the remote agent of the PIN verification results. If the case of a USB thumb drive with ID, the local agent sends the ID to the remote agent and the remote agent verifies the ID.

At block 308, upon successfully logging onto the remote agent, the remote agent loads the user's credential wallet. At block 310, the remote agent automatically injects the appropriate user name and password from the credential wallet in order to log the user onto the remote Windows or remote Citrix metaframe. Alternatively, according to certain embodiments, if the user is already logged onto the Windows or UNIX desktop on the remote computer, the user has the option to log into the remote agent from the Windows or UNIX desktop on the remote computer.

At block 312, when the user attempts to log onto any application on the remote computer, the remote agent is then able to obtain the appropriate application credential from the credential wallet for automating the login procedure in order to obtain access to the application on behalf of the user.

Alternatively, the remote agent may verify the second factor credential first before verifying the user's password. For example, the user has presented his second factor token, such as an RFID proximity card, and the local agent sends the RFID to the remote agent. The remote agent then asks the user for his password and verifies both the RFID and the password. In the case of a fingerprint authentication, the local agent captures the user's fingerprint and sends the captured fingerprint to the remote agent for verification. The remote agent asks the user for his password and verifies both the fingerprint and password. In the case of a smart card token, the local agent detects the insertion of the smart card token at a USB port at the local computer or detects data from a smart card reader associated with the local computer. After detecting the insertion of the smart card token, the local agent asks the remote agent for the password of the user. The remote agent asks the user for his password and sends the password to the local agent. The local agent verifies the smart card PIN with the password received from the remote agent. The local agent then notifies the remote agent of the PIN verification results. If the case of a USB thumb drive with ID, the local agent sends the ID to the remote agent. The remote agent then asks the user for his password and verifies both the password and the ID.

According to certain embodiments, when the user wishes to access an application program on the remote computer, the remote agent on the remote computer asks the local agent for application credentials. As a non-limiting example, the remote agent may ask the local agent for a one-time password for injecting to the desired application program. The local agent generates a one-time password using a USB Smart card token, for example. The local agent sends the generated one-time password to the remote agent. The remote agent then injects the one-time password to the desired application program so that the user can gain access to the desired application program. According to certain embodiments, before the remote agent injects the one-time password, the remote agent may ask the user to re-enter the PIN associated with USB Smart card token. The remote agent then sends the entered PIN to the local agent for re-verification. Only upon re-verification of the PIN does the remote agent inject the one-time password to the desired application program.

Figure 4:
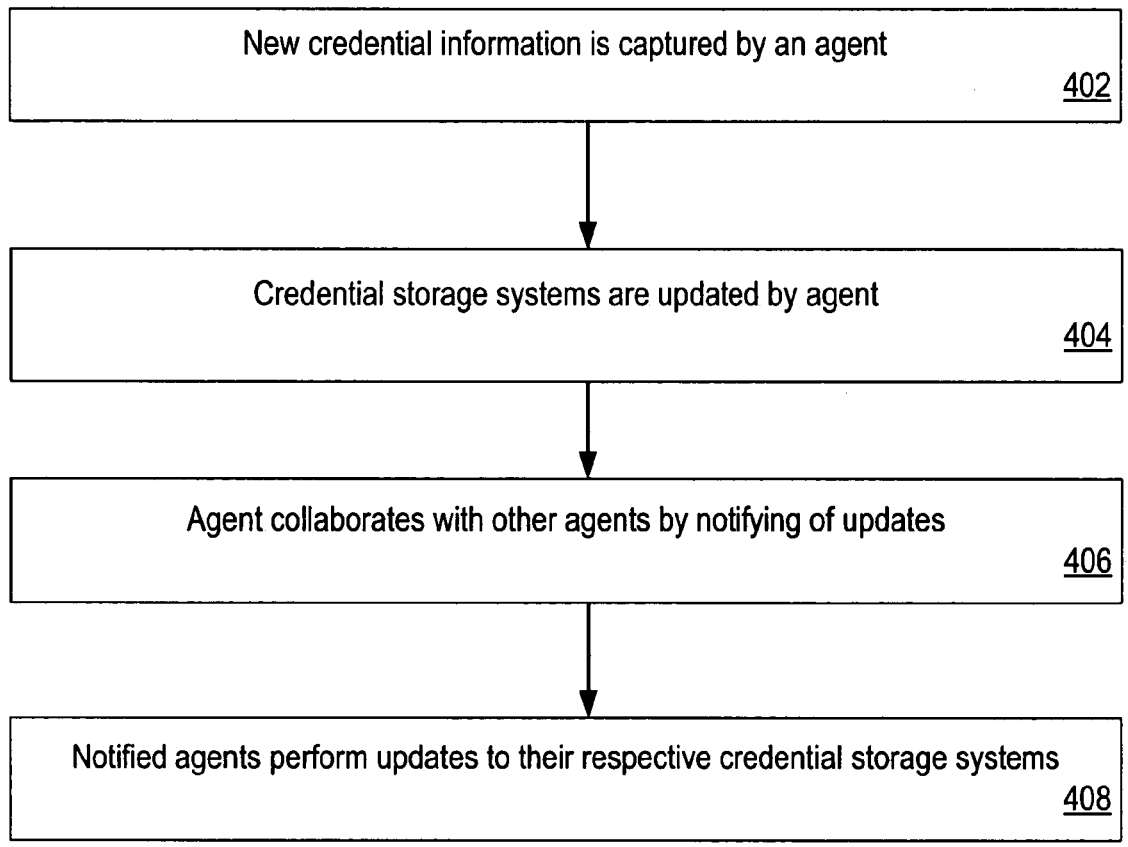
FIG. 4 is a flowchart that illustrates the synchronization of authentication credentials, according to certain embodiments.

FIG. 4 is a flowchart that illustrates the synchronization of authentication credentials, according to certain embodiments. At block 402, any changes in user name and password information is captured by the appropriate agent. For example, if changes in the authentication credentials occur on the local computer, then the local agent captures the changes. Similarly, if changes in the authentication credentials occur on the remote computer, then the remote agent captures the changes.

At block 404, after the changes in authentication credentials are captured, then all relevant credential storage systems are updated with the new credential information. At block 406, the agent that initially captured the changes in the authentication credentials notifies the other agents on remote computers of the updated authentication credentials. At block 408, in response to the notification of updated authentication credentials, the notified agents update their respective credential storage systems.

In the foregoing specification, embodiments of the invention have been described with reference to numerous specific details that may vary from implementation to implementation. It will be evident that various modifications and changes may be made thereto without departing from the broader spirit and scope of the invention. The specification and drawings are, accordingly, to be regarded in an illustrative rather than a restrictive sense.

We claim:

1. A computer-implemented method for providing a user secure access to a plurality of applications that run on one or more computers of a plurality of computers, the computer-implemented method comprising:

using a corresponding computer-implemented authentication agent on each computer of said plurality of computers, wherein said corresponding computer-implemented authentication agents collaborate with each other for automating authentication to access any application of said plurality of applications running on any of said one or more computers;

securely logging onto a local computer-implemented authentication agent on a local computer associated with said user, wherein said local computer-implemented authentication agent is one of said corresponding computer-implemented authentication agents;

securely logging onto a remote computer-implemented authentication agent corresponding to a remote computer, wherein said remote computer-implemented authentication agent is one of said corresponding computer-implemented authentication agents;

receiving an update to authentication information associated with one of the local computer-implemented authentication agent or the remote computer-implemented authentication agent; and synchronizing the update to the authentication information with the other of the local computer-implemented authentication agent or the remote computer implemented authentication agent such that the authentication information associated with the local computer-implemented authentication agent and the remote computer-implemented authentication agent are maintained consistent.

2. The computer-implemented method of claim 1, further comprising using a password and a second factor authentication credential.

3. The computer-implemented method of claim 2, wherein said second factor authentication credential comprises any second factor authentication credential from a set of second factor authentication credentials comprising a USB smart card token, a USB thumb drive with corresponding ID, an RFID proximity card, and a fingerprint.

4. The computer-implemented method of claim 1, further comprising retrieving application authentication credentials for said plurality of applications by said local computer-implemented authentication agent.

5. The computer-implemented method of claim 1, further comprising retrieving operating system login credentials associated with said local computer by said local computer-implemented authentication agent.

6. The computer-implemented method of claim 4, wherein said application authentication credentials for said plurality of applications are retrieved from one or more of: a hard disk that is associated with said local computer, a remote credential management server, a removable storage media, and a USB smart card token.

7. The computer-implemented method of claim 5, wherein said operating system login credentials are retrieved from one or more of: a hard disk that is associated with said local computer, a remote credential management server, a removable storage media, and a USB smart card token.

8. The computer-implemented method of claim 1, further comprising establishing a secure channel of communication between any the local and remote computer-implemented authentication agents.

9. The computer-implemented method of claim 1, wherein the remote computer-implemented authentication agent collaborates with the local computer-implemented authentication agent on the local computer associated with said user to assist with verifying second factor credentials.

10. The computer-implemented method of claim 1, further comprising retrieving operating system login credentials associated with said remote computer for starting an operating system session on said remote computer.

11. The computer-implemented method of claim 10, wherein said operating system login credentials associated with said remote computer are retrieved from one or more of: a hard disk that is associated with a local computer associated with said user, a remote credential management server, a removable storage media, and a USB smart card token.

12. The computer-implemented method of claim 1, wherein the remote computer-implemented authentication agent collaborates with the local computer-implemented authentication agent on the local computer associated with said user for obtaining a credential wallet of said user, wherein said credential wallet includes:
   operating system login credentials for starting an operating system session on said remote computer for said user; and
   application authentication credentials for accessing said plurality of applications.

13. The computer-implemented method of claim 12, further comprising injecting, by said remote computer-implemented authentication agent, a corresponding application authentication credential from said wallet for a selected application of said plurality of applications on behalf of said user when attempting to access said selected application.

14. The computer-implemented method of claim 12, further comprising injecting, by said remote computer-implemented authentication agent, said operating system login credentials for starting said operating system session on said remote computer on behalf of said user.

15. The computer-implemented method of claim 1, further comprising:
   receiving, by said local computer-implemented authentication agent on said local computer, a request from said remote computer-implemented authentication agent for a one-time password;
   generating, by said local computer-implemented authentication agent, said one-time password using a smart card token, wherein the one-time password is a password that can be used only once to access a one-time-password enabled application and cannot be reused; and
   sending said one-time password to said remote computer-implemented authentication agent for injection to the one-time-password enabled application on said remote computer.

16. The computer-implemented method of claim 15, further comprising:
   requesting said user for a token pin associated with a USB Smart Card;
   sending said token pin by said remote computer-implemented authentication agent to said local computer-implemented authentication agent on said local computer for verification with said USB Smart Card; and
   upon successful verification then injecting said one-time password to said one-time-password enabled application on said remote computer by said remote computer-implemented authentication agent.

17. The computer-implemented method of claim 9, further comprising verifying a password and user name of said user before verifying said second factor credentials.

18. The computer-implemented method of claim 9, further comprising verifying a password of said user after verifying said second factor credentials.

19. The computer-implemented method of claim 17, wherein said second factor credentials includes an RFID proximity card and wherein verifying said second factor credentials further comprises using said local computer-implemented authentication agent to send an RFID associated with said RFID proximity card to said remote computer-implemented authentication agent for verification.

20. The computer-implemented method of claim 17, wherein said second factor credentials includes a fingerprint or other biometric data and wherein verifying said second factor credentials further comprises using said local computer-implemented authentication agent to send said fingerprint information or said biometric data to said remote computer-implemented authentication agent for verification.

21. The computer-implemented method of claim 17, wherein said second factor credentials includes a USB thumb drive with ID and wherein verifying said second factor credentials further comprises using said local computer-implemented authentication agent to send said ID associated with said USB thumb drive to said remote computer-implemented authentication agent for verification.

22. The computer-implemented method of claim 17, wherein said second factor credentials includes a USB smart card token and wherein verifying said second factor credentials further comprises:
   using said local computer-implemented authentication agent to request a PIN associated with said USB smart card token from said remote computer-implemented authentication agent;
   using said remote computer-implemented authentication agent to send said PIN to said local computer-implemented authentication agent for verification with said USB smart card token.

23. The computer-implemented method of claim 18, wherein said second factor credentials includes an RFID proximity card and wherein verifying said second factor credentials further comprises:
   using said local computer-implemented authentication agent to send an RFID associated with said RFID proximity card to said remote computer-implemented authentication agent; and
   using said remote computer-implemented authentication agent to request said password from said user and verifying said RFID and said password received from said user.

24. The computer-implemented method of claim 18, wherein said second factor credentials includes a fingerprint or other biometric data and wherein verifying said second factor credentials further comprises:
   using said local computer-implemented authentication agent to send said fingerprint information or said biometric data to said remote computer-implemented authentication agent; and
   using said remote computer-implemented authentication agent to request said password from said user and verifying said fingerprint information or said biometric data and said password received from said user.

25. The computer-implemented method of claim 18, wherein said second factor credentials includes a USB thumb drive with ID and wherein verifying said second factor credentials further comprises:
  using said local computer-implemented authentication agent to send said ID to said remote computer-implemented authentication agent; and
  using said remote computer-implemented authentication agent to request said password from said user and verifying said ID and said password received from said user.

26. The computer-implemented method of claim 18, wherein said second factor credentials includes a USB smart card token and wherein verifying said second factor credentials further comprises:
  using said local computer-implemented authentication agent to request a PIN associated with said USB smart card token from said remote computer-implemented authentication agent; and
  using said remote computer-implemented authentication agent to request said password from said user and to send said password to said local computer-implemented authentication agent for verification with said USB smart card token.

27. An authentication system for authenticating a user who wishes to access a plurality of applications that are managed by any computer of a plurality of computers, said authentication system comprising:
  a local computer; and
  a remote computer coupled to the local computer via a secure channel of communication, wherein a corresponding computer-implemented authentication agent is provided on each of the local and remote computers, wherein said corresponding computer-implemented authentication agents collaborate with each other for automating fortified authentication to access any application of said plurality of applications running on any of said plurality of computers, and wherein:
  a user securely logs onto a local computer-implemented authentication agent on the local computer,
  the user securely logs onto a remote computer-implemented authentication agent corresponding to the remote computer,
  an update to authentication information associated with one of the local computer-implemented authentication agent or the remote computer-implemented authentication agent is received from the user, and
  the update to the authentication information is synchronized with the other of the local computer-implemented authentication agent or the remote computer implemented authentication agent such that the authentication information associated with the local computer-implemented authentication agent and the remote computer-implemented authentication agent are maintained consistent.

28. The authentication system of claim 27, further comprising a second factor authentication credential wherein said second factor authentication credential comprises any second factor authentication credential from a set of second factor authentication credentials comprising a USB smart card token, a USB thumb drive with ID, an RFID proximity card, and a fingerprint.

29. The authentication system of claim 27, further comprising a remote credential management server from which user authentication credentials and application authentication credentials for said plurality of applications are retrieved.

30. The authentication system of claim 27, further comprising a local hard disk associated with a local computer that is associated with said user, wherein user authentication credentials and application authentication credentials for said plurality of applications are retrieved from said local hard disk.

31. The authentication system of claim 27, further comprising a removable storage medium from which user authentication credentials and application authentication credentials for said plurality of applications are retrieved.

32. The authentication system of claim 27, further comprising a credential wallet of said user, wherein said credential wallet includes:
  operating system login credentials for starting an operating system session on a remote computer for said user; and
  application login credentials for accessing said plurality of applications.

33. The authentication system of claim 32, further comprising sending said credential wallet to the remote computer-implemented authentication agent on said remote computer by the local computer-implemented authentication agent on a local computer that has access to said credential wallet.

34. The authentication system of claim 27, wherein:
  the local computer-implemented authentication agent on the local computer receives a request from the remote computer-implemented authentication agent for a one-time password,
  the local computer-implemented authentication agent generates the one-time password using a smart card token, wherein the one-time password is a password that can be used only once to access a one-time-password enabled application and cannot be reused, and
  the local computer-implemented authentication agent sends the one-time password to the remote computer-implemented authentication agent for injection to the one-time-password enabled application on the remote computer.

* * * * *